United States Patent
Yakovenko

(10) Patent No.: US 6,661,575 B1
(45) Date of Patent: Dec. 9, 2003

(54) METHODS AND APPARATA FOR MICROMANIPULATION OF MICRO-AND NANOPARTICLES

(76) Inventor: Sergey A. Yakovenko, Kolomenskly Proezd 8-3-299, Moscow, 115446 (RU)

( * ) Notice: Subject to any disclaimer, the term of this patent is extended or adjusted under 35 U.S.C. 154(b) by 526 days.

(21) Appl. No.: 09/702,337

(22) Filed: Oct. 31, 2000

(51) Int. Cl.[7] .................... G02B 21/26; G02B 21/34; C12M 1/00; C12M 1/26
(52) U.S. Cl. ................. 359/393; 435/283.1; 435/286.2; 359/398
(58) Field of Search ................ 359/391, 393, 359/398; 435/285.1, 286.2, 308.1

(56) References Cited

U.S. PATENT DOCUMENTS

| | | | |
|---|---|---|---|
| 3,835,338 A | 9/1974 | Martin | 411/265 |
| 4,139,948 A | 2/1979 | Tsuchiya et al. | 359/391 |
| 4,154,228 A | 5/1979 | Feldstein et al. | 606/169 |
| 4,270,838 A | 6/1981 | Furusawa et al. | 359/385 |
| 4,275,611 A | 6/1981 | Asher | 74/471 XY |
| 4,367,914 A | 1/1983 | Mukasa | 359/385 |
| 4,601,551 A | 7/1986 | Pettingell et al. | 359/376 |
| 4,610,475 A | 9/1986 | Heiserman | 294/86.4 |
| 4,619,899 A | 10/1986 | Nikitin et al. | 435/455 |
| 4,679,976 A | 7/1987 | Narishige et al. | 414/4 |
| 4,694,230 A | 9/1987 | Slocum | 318/490.13 |
| 4,700,584 A | 10/1987 | Narishige et al. | 414/4 |
| 4,749,270 A | 6/1988 | Endo et al. | 359/392 |
| 4,836,244 A | 6/1989 | Ansorge | 137/557 |
| 4,894,579 A | 1/1990 | Higuchi et al. | 310/328 |
| 4,901,446 A | 2/1990 | Narishige et al. | 33/572 |
| 4,920,053 A | 4/1990 | Inoue et al. | 435/30 |
| 4,946,329 A | 8/1990 | Krueger | 414/4 |
| 5,162,780 A | 11/1992 | Solhjell | 345/164 |
| D332,793 S | 1/1993 | Jankowiak | D16/136 |
| 5,229,679 A | 7/1993 | Higuchi et al. | 310/328 |
| 5,325,010 A | 6/1994 | Besocke et al. | 310/317 |
| 5,456,880 A | 10/1995 | Miura | 422/100 |

(List continued on next page.)

FOREIGN PATENT DOCUMENTS

| | | |
|---|---|---|
| JP | 58223268 | 6/1985 |
| JP | 62005127 | 7/1988 |
| JP | 4041187 A2 | 2/1992 |
| JP | 08281497 | 4/1998 |
| JP | 09287953 | 4/1999 |

OTHER PUBLICATIONS

Brown K.T., Flaming D.G. Advanced micropipette techniques for cell physiology. *IBRO Handbook series: methods in the neurosciences,* V.9, John Wiley & Sons,1995.

(List continued on next page.)

*Primary Examiner*—David N. Spector
(74) *Attorney, Agent, or Firm*—Craig A. Fieschko, Esq.; DeWitt Ross & Stevens S.C.

(57) ABSTRACT

The invention involves methods and apparata for manipulating micro-/nanoobjects. A holder exerts a weak attractive force on the micro-/nanoobject (by, for example, suction from negative fluid pressure, electrostatic attraction, magnetic attraction, etc.). A vibrator coupled to the holder generates orbital motion in the holder in at least one plane. As long as the attractive force is not too high, the orbital motion of the holder will cause rotation of the micro-/nanoobject, with the attractive force of the holder maintaining the micro-/nanoobject adjacent the holder during such rotation. Once the micro-/nanoobject has been rotated to a desired orientation, the attractive force of the holder on the micro-/nanoobject can be increased to such a level that the micro-/nanoobject will be firmly fixed to the holder. The orbital motion of the holder can be provided in conjunction with translational motion of the holder (as provided by a microdrive or similar positioning device), thereby allowing positioning of the micro-/nanoobject in as many as six degrees of freedom.

20 Claims, 2 Drawing Sheets

U.S. PATENT DOCUMENTS

| | | | |
|---|---|---|---|
| 5,538,305 A | | 7/1996 | Conway et al. ........... 294/119.1 |
| 5,557,714 A | | 9/1996 | Lines et al. .................. 345/653 |
| 5,572,999 A | | 11/1996 | Funda et al. ................. 600/118 |
| 5,589,047 A | * | 12/1996 | Coster et al. ................ 204/450 |
| 5,606,162 A | | 2/1997 | Buser et al. ................. 250/306 |
| 5,620,371 A | | 4/1997 | Blonder ........................ 463/37 |
| 5,677,709 A | | 10/1997 | Miura et al. ................. 345/161 |
| 5,727,915 A | | 3/1998 | Suzuki ........................... 414/1 |
| 5,751,275 A | | 5/1998 | Bullister ..................... 345/167 |
| 5,760,300 A | | 6/1998 | Kajimura ..................... 73/105 |
| 5,831,166 A | | 11/1998 | Kozuka et al. ............... 73/570 |
| 5,845,541 A | | 12/1998 | Yoneyama ............... 74/490.12 |
| 5,973,471 A | | 10/1999 | Miura et al. ................. 318/640 |
| 6,055,859 A | | 5/2000 | Kozuka et al. ............... 73/570 |
| 6,063,629 A | | 5/2000 | Knoblauch .................. 435/455 |
| 6,136,182 A | * | 10/2000 | Dolan et al. ................... 210/94 |
| 6,357,719 B1 | * | 3/2002 | Yakovenko ................. 248/689 |

2003/0066956 A1 * 4/2003 Gruber et al. .............. 250/251

OTHER PUBLICATIONS

Chen V.K. A simple piezoelectric drive for glass micropipette electrodes. *J. Phys. E. Sci. Instrum,* 1978, 11,1092–1093.

Ellis G.W. Piezoelectric micromanipulators, *Science,*1962, 138,84–91.

Fulka et al., Oocyte polarity: ICSI, cloning and related techniques. *Human Reprod.,* vol.13 No. 12, pp.3303–3305, 1998.

Maksimovskii,L.F. and Mikichur, N.I. Methods of micromanipulations and ultramicroanalysis in biology and medicine (in Russian). Novosibirsk, 1989.

* cited by examiner

METHODS AND APPARATA FOR MICROMANIPULATION OF MICRO- AND NANOPARTICLES

FIELD OF THE INVENTION

The invention relates generally to micromanipulation operations in the fields of microtechnology and nanotechnology. More specifically, the invention relates to methods and apparata for positioning micro-/nanoobjects, e.g., cells, genetic material, and molecules, in a user-defined orientation.

BACKGROUND OF THE INVENTION

The micromanipulation of biological material such as cells is of extreme importance to modern biological investigation and biotechnology. Generally, a microscope, usually an inverted phase contrast microscope, is used to visualize the biological material to be manipulated. A 1, 2, or 3 axis micromanipulator is then used to manipulate and position the biological material within the view of the microscope. Usually such micromanipulators consist of a joystick and a microdrive which is moved in response to the user's joystick actuation. Current microdrives use pneumatic, hydraulic, mechanical (e.g., screw), electromechanical (e.g., stepping motor), electromagnetic, electrostatic, piezoelectric, and magnetostrictive principles of operation to provide movement, with examples being provided in U.S. Pat. Nos. 3,835,338; 4,139,948; 4,270,838; 4,367,914; 4,610,475; 4,679,976; 4,694,230; 4,700,584; 4,749,270; 4,836,244; 4,894,579; 4,901,446; 5,325,010; 5,456,880; 5,677,709; 5,831,166; 5,845,541; 5,973,471; and 6,055,859.

Microtools, such as glass micropipettes or microcapillaries, are attached to the microdrives. The size, shape, and other characteristics of the microtool depend on the operations to be performed; for example, a micropipette for fixing (holding) oocytes generally has a round diameter of about 50–120 microns, whereas the diameter of a micropipette for fixing other cells could be less than 50 microns, or as great as 120 microns (or sometimes greater). Two or more microtools are often used simultaneously on the same microdrive. One microtool (generally a micropipette), termed the holder and denoted by the reference numeral 12 in FIG. 1, is used to fix/grasp the biological material (e.g., an oocyte) so as to effect its micromanipulation. The fixing of an oocyte 100 at the tip of the holder 12 involves supplying negative medium pressure inside the holder 12. The negative pressure can be supplied by several sources, such as a microsyringe or a vacuum device connected to the holder 12 by tubing. A vacuum device, such as in U.S. Pat. No. 5,456,880, is preferred because it provides a desired precise amount of pressure, and constant negative or positive pressure can be maintained even if medium leakage owing to non-tight contact with the oocyte at the holder tip occurs.

In some applications, precise manipulation of biological material can be of critical importance. For example, operations on oocytes—such as removal of genetic material from an oocyte, transferring somatic cells under an oocyte's zona pellucida in cloning technology, and injection of genetic material into an oocyte's pronucleus for production of transgenic animals—all present problems of oocyte orientation. Oocytes must also be carefully manipulated into a precise orientation when performing IVF (in vitro fertilization) or other assisted reproduction operations such as ICSI (intracytoplasmic sperm injection), PZD or ZD (partial or full zona dissection), SUZI (sperm under zona injection). In most species, an oocyte is comprised of an animal and vegetal component, and the location of the oocyte's first polar body identifies the animal pole. For example, referring to FIG. 1, ICSI into an oocyte 100 involves orientation of the matured oocyte 100 with the holder 12 to situate the polar body 102 at a 6 o'clock or 12 o'clock position. Otherwise, a micropipette or other microtool acting on the oocyte 100 from at or near the horizontal plane could damage the meiotic spindle and metaphase plate during ICSI.

The micromanipulation of biological cells as described in the above-referenced patents uses a combination of weakly-controlled cell rotation and translational cell motion, and generally only allows for partial (i.e., less than 360°) rotation. Usually, after being coarsely oriented in generally the desired orientation, the oocyte 100 is non-firmly fixed in the holder 12 so that it may be finely oriented by the use of other micropipettes. Finally, once the oocyte 100 is positioned as desired, it is firmly fixed on the holder 12 so further microoperations may be performed e.g., injection of spermatazoa in ICSI. Often, difficulties are encountered because the non-spherical shape of the oocyte 100 leads to undesired oocyte movement and orientation, particularly when fine orientation is being performed. Additional problems occur because the injected cells tend to stick to the surfaces of the holder 12 and.or other microtools, especially when somatic cells or spermatozoa are inside the micropipette or other injection apparatus. Thus, orientation of oocytes is often a repetitive, time-consuming, trial-and-error process, and leads to significantly decreased efficiency in operations such as cloning, IVF and the like. Time is wasted in attaining the proper orientation, and the oocyte 100 is meanwhile experiencing time damage because it is resting in a non-native environment. This is a significant factor in causing the failure of such operations.

Apart from orientation problems in biological fields, similar problems exist in the field of scanning probe microscopy (SPM) and in nanotechnology. In such fields, it is necessary to rotate and otherwise orient microparticles, nanoparticles and molecules in order to observe or manipulate them, and thereby create nanostructures and nanodevices. See, for example, U.S. Pat. Nos. 5,606,162 and 5,760,300.

SUMMARY OF THE INVENTION

The invention, which is defined by the claims set forth at the end of this document, is directed to methods and apparata for manipulating micro-/nanoobjects which at least partially alleviate the aforementioned problems. A basic understanding of some of the preferred features of the invention can be attained from a review of the following brief summary of the invention, with more details being provided elsewhere in this document.

The invention involves methods and apparata for manipulating micro-/nanoobjects wherein a microtool exerts an attractive force on the micro-/nanoobject, and a vibrator coupled to the microtool generates oscillating motion in the microtool (and more preferably orbital motion in the microtool) in at least one plane. It has been found that so long as the attractive force on the micro-/nanoobject is not too high, the oscillating motion of the microtool will cause rotation of the micro-/nanoobject, with the "weak" attractive force of the microtool maintaining the micro-/nanoobject adjacent the microtool during such rotation. In essence, the microtool oscillation drives the rotation of the micro-/ nanoobject, while at the same time it helps to avoid sticking of the micro-/nanoobject to the microtool. Once the micro-/nanoobject has been rotated to a desired orientation, the attractive force of the microtool on the micro-/nanoobject can be increased to such a level that the micro-/nanoobject will be firmly fixed to the microtool. Such fixation is more easily accomplished if the orbital motion of the microtool is ceased after the micro-/nanoobject is rotated to the desired orientation.

Orbital motion of the microtool can be achieved by providing linear oscillating inputs to the microtool in two different directions (e.g., in two different orthogonal directions), and providing a phase difference in the oscillations. In effect, the oscillating inputs to the microtool are tailored to have the microtool move in a Lissajous pattern. Orbital motion may occur in one or more planes, i.e., in one or more degrees of freedom, to rotate micro-/nanoobjects in these planes. As an example, if the vibrator includes three oscillators affixed to the microtool which respectively cause microtool oscillation in the X, Y, and Z directions, coordination of the oscillations in the X and Y directions can generate orbital motion in the XY plane (i.e., rotation about the Z axis); coordination of the oscillations in the X and Z directions can generate orbital motion in the XZ plane (i.e., rotation about the Y axis); and coordination of the oscillations in the Y and Z directions can generate orbital motion in the YZ plane (i.e., rotation about the X axis). Rotation in these planes may occur simultaneously or sequentially. Varying the frequency, amplitude, and form (e.g., phase relationship) of the orbital motion, as well as the degree of attractive force provided by the microtool, allows the user to vary the direction and frequency (speed) of rotation of the micro/nanoobject as desired.

The microtool's attractive force may be created by a force generator coupled to the microtool, and the force generator may take a variety of forms. A first example is a vacuum device which varies the fluid pressure inside a fluid-varying microtool such as a micropipette with respect to the ambient pressure of the fluid surrounding the micro-/nanoobject, thereby generating an attractive suction force. A second example is a charge generator which positively or negatively charges the microtool, thereby making it attractive to negatively or positively charged or polarized micro-/nanoobjects (or portions thereof). Another example is an electromagnet or similar device which magnetically polarizes the microtool, thereby making it attractive to ferromagnetic micro-/nanoobjects (or portions thereof). A final example is a device which varies the size, shape, or other characteristics of the microtool so as to generate varying degrees of Van der Waals forces in the microtool (e.g., by extending or retracting attractive filaments from the tip or other portion of the microtool).

The microtool is preferably positioned adjacent to an operating stage whereupon the micro-/nanoobjects may rest, with a microscope being positioned adjacent the microtool and the operating stage so that the user may monitor the positioning of the micro-/nanoobject and modify it as desired. While viewing the positioning of the micro-/nanoobject, the user may actuate an input device, preferably a trackball, to which the vibrator is responsive to thereby provide the user's indicated motion inputs as output motion at the microtool. Thus, in accordance with the user's rotational input at the trackball, corresponding rotation of the micro-/nanoobject occurs. The invention may also incorporate a microdrive which is coupled to the microtool and which may translate the microtool in one or more directions, so that the invention may allow the user to both rotate and translate the micro-/nanoobject in question.

Unlike prior manipulation inventions known to the inventor, the invention allows for rotation of a micro/nanoobject in as many as three degrees of freedom, and overall positioning of a micro/nanoobject in as many as six degrees of freedom if the invention incorporates a microdrive or other translational positioner. The invention is believed to have particular value in biotechnology applications since it decreases micromanipulation time and therefore decreases cell damage and increases cell viability. By use of the invention, the cell need not rest in non-native conditions for a long period before the cell can be properly positioned for performance of the desired microoperation. Applications where the invention proves particularly helpful include microsurgery of living cells, ICSI (intracytoplasmic sperm injection), IVF (in vitro fertilization), injection of genetic material for obtaining of transgenic animals, nuclear transfer for cloning, embryology, intracellular electrophysiology investigations, ultra-microanalysis, other fields of biotechnology, and the assembly and observation of microparticles, nanoparticles and molecules. The invention has been found to be particularly useful in the micromanipulation of oocytes and embryos.

Further advantages and objects of the invention will be apparent from the following detailed description of a preferred embodiment of the invention, which is made in conjunction with the accompanying drawings.

DETAILED DESCRIPTION OF PREFERRED EMBODIMENTS OF THE INVENTION

Figure 1:
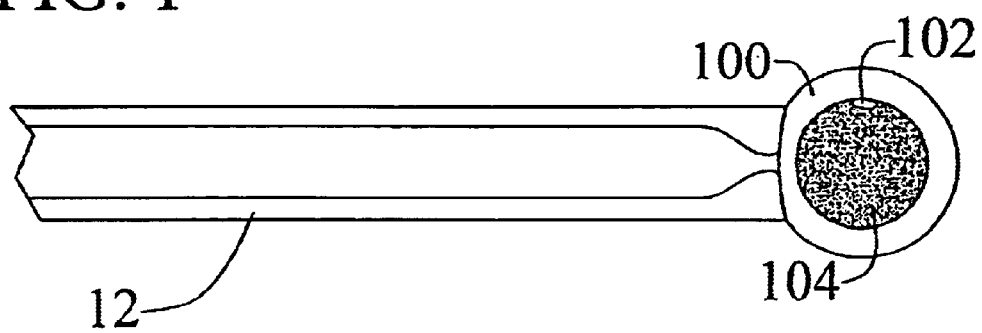
FIG. 1 shows an oocyte 100 with a polar body 102 and zona pellucida 104 fixed by a holder (micropipette or other microtool) 12 by negative fluid pressure of the medium inside the holder 12.
Figure 2:
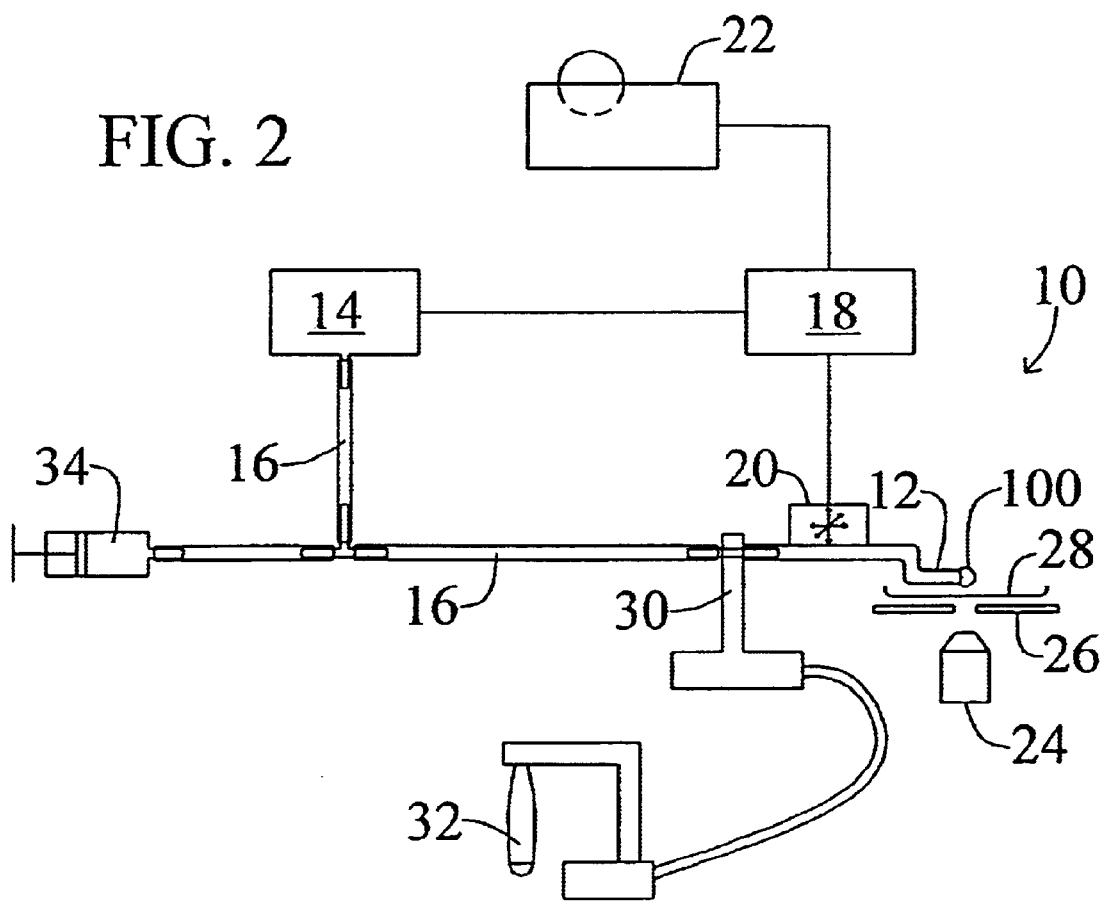
FIG. 2 is a diagram of a preferred embodiment of the apparatus of the invention.

Referring to FIG. 2, a particularly preferred embodiment of the invention is shown as the manipulation apparatus 10. The manipulation apparatus 10 includes a holder 12, a microtool which carries micro/nanoobjects 100 and which may be (for example) a micropipette, a probe tip of a scanning probe microscope, a microelectrode, a stylus tip, a cantilever, or a similar devices. The micro/nanoobjects 100 are held by the holder 12 by means of an attractive force provided by a force generator 14. Attractive forces suitable for use in the invention include fluid pressure forces (e.g., air pressure when manipulation of the micro-/nanoobject 100 occurs in air, or pressure of another fluid when manipulation occurs in another medium); electrostatic forces (suitable where the micro/nanoobjects 100 bear a charge on at least a portion of their area, see, e.g., Japanese patent application 58223268); magnetic forces (suitable when the micro/nanoobjects 100 are ferromagnetic); Van der Waals forces; or virtually any other attractive force. Naturally, the attractive force or forces recommended for use on any particular type of micro/nanoobject 100 will vary in accordance with the material properties, size, shape, etc. of the micro/nanoobject in question. In FIG. 2, the attractive force is fluid pressure, and is provided by a force generator 14 in the form of a vacuum device which communicates with the holder 12 via tubing 16. A vacuum device can be used to provide a precise desired amount of gas or liquid pressure, and can provide at least substantially constant negative or positive pressure even if there is pressure leakage owing to non-tight contact with the micro/nanoobject 100 at the tip of the holder 12. For example, a 50 microliter syringe is commonly used as a vacuum device for micromanipulation, though it must often be recharged owing to pressure leakage through the pumper.

The force generator 14 is at least partially controlled by a microprocessor or other control unit 18. The control unit 18 provides a control signal to the force generator 14 to have the holder 12 establish weak attractive force (e.g., negative fluid pressure) at its tip. This pressure allows the micro/nanoobject 100 to be fixed non-firmly to the tip of the holder 12, with such a non-firm grip being important during rotation of the micro/nanoobject for reasons noted below. The control unit 18 can also provide control signals to the force generator 14 to have the holder 12 establish a higher, fixing attractive force between the tip of the holder 12 and the micro/nanoobject 100 when rotation of the micro/nanoobject is ceased.

One or more vibrators 20 are coupled to the holder 12 to cause mechanical vibrations of the holder 12 about at least a pair of orthogonal axes, i.e., in at least one plane. As will be described at greater length below, simultaneous vibration in at least two axes (i.e., in at least one plane), if properly effected, will cause the tip of the holder 12 to move in a circular or other orbital motion, and this orbital motion can be used to effect rotation of the micro/nanoobject 100. The vibrators 20 may be provided by piezoelectric, electromagnetic, electrostatic, magnetostrictive, or other transducers, and may operate in the sonic or ultrasonic range. The vibrators 20 may be attached to the holder 12 directly, or indirectly via a gripping mechanism or the like.

An input device 22 allows a user to act on the holder 12 to control rotation of the micro/nanoobject 100, i.e., to set the direction, start of rotation, end of rotation, and speed/frequency of rotation of the micro/nanoobject 100. The most preferred input device 22 is a trackball because its application to rotational movement is highly intuitive, with the direction and frequency of the trackball's rotation corresponding to that desired by the user for the micro/nanoobject 100. The input signal generated by the user at the input device 22 is converted by the control unit 18 into vibration of the holder 12, as will be discussed below.

The manipulation apparatus 10 also preferably includes several other elements which enhance its utility. First, a microscope 24 is preferably provided on or adjacent to an operating stage 26 which supports the micro/nanoobject 100 to be operated upon. In FIG. 2, a Petri dish 28 is shown bearing the micro/nanoobject 100 on the operating stage 26. The Petri dish 28 is of course not essential to the invention, but is useful where the micro/nanoobject 100 is biological material such as an oocyte, in which case the micro/nanoobject 100 might be maintained in a liquid medium to better preserve its viability. Second, a microdrive 30 and joystick 32 are preferably provided so that translation of the holder 12 (and the micro/nanoobject 100) in at least one dimension can be effected. Finally, a manual attractive force generator 34 (e.g., a syringe) is preferably provided, which allows the user to manually set an attractive force (e.g., negative air pressure) at the tip of the holder 12 to firmly fix the micro/nanoobject 100 when desired.

Further features of the invention are then better understood by reviewing a preferred mode of operation of the manipulation apparatus 10, which will now be summarized.

Figure 3:
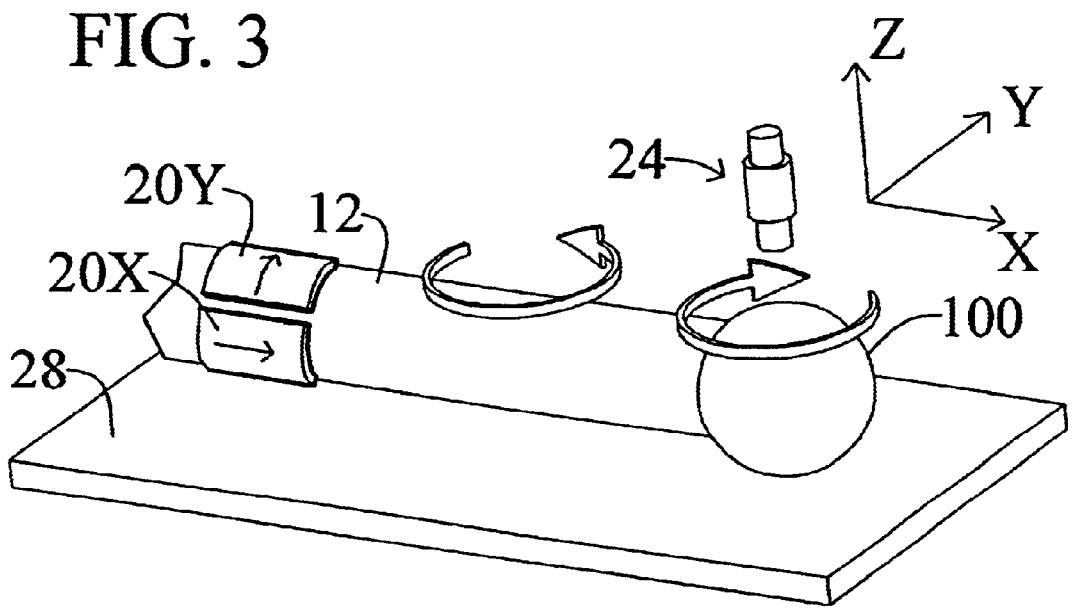
FIG. 3 is a perspective view illustrating the relationship between the direction of orbital motion of the holder 12 and the corresponding rotational direction of an oocyte 100 (the motion of both the holder 12 and the oocyte 100 being in the XY plane).

When there is no input at the input device 22 (e.g., when the trackball input device 22 is at rest), the control unit 18 provides a control signal to the force generator 14 to establish a higher attractive force at the tip of the holder 12 and ensure firm fixing of the micro/nanoobject 100. When the user provides input at the input device 22, the control unit 18 signals the force generator 14 to establish weaker attractive force at the tip of the holder 12, and also signals the vibrator 20 to begin vibrating in two or more axes to generate orbital motion of the tip of the holder 12 in one or more planes. To explain by example, consider the vibrator 20 in FIG. 2 as having one or more piezoelectric (or other) oscillators capable of vibrating the holder 12 in the X direction and in the Y direction, with the XY plane being parallel to the operating stage 26 (and the Petri dish 28). Keeping in mind the principles used to generate Lissajous figures for inputs in the field of physics, if the X and Y vibrations in the holder 12 are of the same frequency and different phase, the holder 12 will oscillate in an orbital path; for example, X and Y vibrations of the same frequency and amplitude, but 90 degrees out of phase, will cause the tip of the holder 12 to move in a perfectly circular path in the XY plane. Looking to FIG. 3, which illustrates an oocyte 100 being acted on by a holder 12 having such a motion in the XY plane (as generated by separate X and Y vibrators 20X and 20Y), the induced motion of the oocyte 100 is illustrated: it will rotate in the opposite direction than the holder 12, and generally at a lesser frequency. It should be understood that by applying the appropriate vibrational inputs to the holder in two or more of the X, Y, and Z directions, the holder 12 can be made to rotate the micro/nanoobject 100 in one or more desired planes, including the possibility of rotation in multiple planes simultaneously. The speed (frequency) of rotation of the micro/nanoobjects 100 is dependent on the vibrational frequency of the holder 12, the amplitude of the vibrations of the holder 12, and the degree of attractive force exerted on the micro/nanoobject 100 by the holder 12 (i.e., the extent of fixation of the micro/nanoobject 100). Note that the rotational speed of the micro/nanoobject 100 is less than the frequency of the holder 12, i.e., the rotations of the micro/nanoobject 100 do not directly correspond to the rotations of the holder 12.

It is noted that orbital vibrations of the holder 12 in the horizontal XY plane and the vertical XZ plane induce rotation of the micro/nanoobject 100 in the same plane, but in opposite directions. However, when the holder 12 is made to orbitally vibrate in the YZ plane—i.e., in the plane perpendicular to the axis of the holder 12—the micro/nanoobject 100 will rotate in the same plane, and in the same direction.

It is important that the micro/nanoobject 100 is not fixed very firmly during rotation. The micro/nanoobject 100 should be sufficiently attracted that it maintains contact with the holder 12 (i.e., so that it maintained at the tip of the holder 12 during vibration of the holder 12), but that it still has the ability to rotate when subjected to orbital vibratory input from the tip of the holder 12. Lower attraction from the force generator 14 is also helpful to avoid deformations of biological micro objects 100, e.g., deformation of the zona pellucida of an oocyte, in the region of contact between the oocyte 100 and the holder 12. This allows the positioning of the micro/nanoobject 100 to be more particularly controlled.

Where air pressure is used as the attractive force, the use of lower attractive force during rotation corresponds to reduced vacuum pressure inside the holder 12. This lower attraction from the holder 12 during rotation is markedly different from the higher attraction used during ordinary micromanipulations in procedures as cloning, IVF and related technologies. Such a reduced attraction corresponds to about 2 to 10 times less microsyringe volume than the amount used for the creation of vacuum pressure during ordinary micromanipulations.

The foregoing behavior of the micro/nanoobject 100 when subjected to the vibrating tip of the holder 12 is readily reproduced, and results in surprisingly easy and precise control of rotation. The mechanism which causes the rotation of the weakly attracted micro/nanoobject 100 versus the vibrating tip of the holder 12 is not completely understood, but is thought to involve a combination of the surface deformations of the micro/nanoobject 100 (where it is deformable), inertia forces, and the sliding and rolling of the micro/nanoobject 100 on the edge of the tip of the holder 12.

In practice, it has been found that a vibrational frequency range for the holder 12 of 20 kHz to 100 kHz works well for micro/nanoobjects 100 such as oocytes, with a vibrational amplitude somewhere between 0.01 microns to 5.00 microns. However, since an optimal frequency and amplitude range will vary for different types of micro/nanoobjects 100 depending on their shape, mass, and other characteristics, as well as on the characteristics of the holder 12, these ranges should not be regarded as recommended for all micro/nanoobjects 100. The most efficient results appear to occur when the vibrational frequencies are at or near the resonant frequency of a system composed of the holder 12 with the attached micro/nanoobject 100.

As previously noted, trackball input is particularly desirable, with the direction and speed of rotation of the trackball input device 22 setting the direction and speed of rotation of a micro/nanoobject 100. For example, a rotation of the trackball in the YZ plane will cause rotation of the micro/nanoobject 100 in the YZ plane, a rotation of the trackball in the XZ plane will cause rotation of the micro/nanoobject 100 in the XZ plane, and so forth. When the trackball is at rest, the micro/nanoobject 100 does not rotate. Various applications of a trackball for manipulation are described in U.S. Pat. Nos. 5,557,714; 5,572,999; 5,620,371; and 5,677,709.

Other input devices 22 are possible apart from trackballs, for example, a joystick. In this case, the direction of rotation of the micro/nanoobject 100 could be controlled by the direction of displacement of the joystick lever, with rotational frequency being dependent on the degree of displacement. For example, movement of joystick lever along the X-axis could cause rotation of the micro/nanoobject 100 in the XZ plane, whereas movement of a joystick lever along the Y-axis could cause rotation of a micro/nanoobject 100 in the YZ plane. Movement of the joystick lever along the X and Y axes simultaneously could cause simultaneous rotation of the micro/nanoobject 100 in the XZ and YZ planes. If a rotating knob or other input device is coupled with the joystick lever, this can be used to provide input for rotation in the XY plane.

Although the holder 12 vibrates in an orbital path, the micro/nanoobject 100 does not vibrate correspondingly owing to the weak attractive force of the holder 12; rather, it remains in the same location and simply rotates in response to the vibrational input from the holder 12. This lack of vibration in the micro/nanoobject 100 is important because it allows the micro/nanoobject 100 to be clearly viewed through the microscope 24, and positioned by use of the input device 22 during such viewing. It is noted that if the images of the micro/nanoobject 100 viewed by the user are inverted in the microscope 24, the controller 18 might invert the signals from the input device 22 so that the input signals provided by the user correspond to the viewed motion of the micro/nanoobject 100, rather than the true motion of the micro/nanoobject 100 (which is in the opposite direction than the one seen by the user).

It should therefore be appreciated that the vibrator 20 can provide positioning of the micro/nanoobject 100 in as many as three degrees of freedom, by providing rotation of the micro/nanoobject 100 about at least one of the orthogonal X, Y, and Z axes. When provided in conjunction with the microdrive 30, which may allow translation of the micro/nanoobject 100 in as many as three dimensions, a user may readily position the micro/nanoobject 100 in as many as six degrees of freedom.

While embodiments of the invention were described with their application to oocytes, it is emphasized that other microparticles, nanoparticles, molecules and microparts could instead be manipulated by the invention. In the biological fields, the invention may have particularly valuable application to microparticles such as living biological cells (e.g., oocytes); embryos, both before and after hatching; and multicellular microorganisms. Other applications include the manipulation of colloidal particles, magnetic particles within magnetic liquids, molecules, clusters of molecules and macromolecules, and microparts of microdevices.

It should be understood that preferred versions of the invention have been described above in order to illustrate how to make and use the invention. The invention is not intended to be limited to these embodiments, but rather is intended to be limited only by the claims set out below. Thus, the invention encompasses all alternate embodiments that fall literally or equivalently within the scope of these claims.

What is claimed is:

1. A manipulation apparatus for a micro-/nanoobject comprising:

a. a holder, the holder being capable of exerting an attractive force on the micro-/nanoobject;

b. a vibrator coupled to the holder, the vibrator being capable of inducing orbital motion in the holder in at least one plane, whereby the orbital motion of the holder causes rotation of the micro-/nanoobject, with the attractive force of the holder maintaining the micro-/nanoobject adjacent the holder during such rotation.

2. The manipulation apparatus of claim 1 wherein the vibrator includes at least two oscillators, each oscillator being capable of inducing linear motion in the holder, and wherein at least two of the oscillators induce linear motion in different directions.

3. The manipulation apparatus of claim 1 wherein the attractive force exerted by the holder is at least one of:

a. negative fluid pressure;

b. electrostatic attraction;

c. magnetic attraction; or d. Van der Waals forces.

4. The manipulation apparatus of claim 1 further comprising a force generator coupled to the holder, the force generator selectively generating an attractive force on the holder.

5. The manipulation apparatus of claim 1 further comprising:

a. an operating stage, adjacent to which the holder is positioned;

b. a microscope adjacent to the operating stage.

6. The manipulation apparatus of claim 1 further comprising a microdrive coupled to the holder, the microdrive being capable of inducing linear motion in the holder in at least one direction.

7. A manipulation apparatus for a micro-/nanoobject comprising:

a. a holder;

b. a force generator coupled to the holder, the force generator selectively generating an attractive force on the holder;

c. a vibrator coupled to the holder, the vibrator selectively generating oscillating motion in the holder in at least one plane.

8. The manipulation apparatus of claim 7 further comprising a controller coupled to the force generator and the vibrator, the controller providing signals to:

a. the force generator to thereby define the level of attractive force on the holder; and b. the vibrator to thereby define at least one of the frequency and amplitude of the oscillating motion of the holder.

9. The manipulation device of claim 8 wherein the controller is coupled to a user input device.

10. The manipulation device of claim 9 wherein the user input device is a trackball.

11. The manipulation device of claim 7 wherein the oscillating motion of the holder is orbital motion.

12. The manipulation apparatus of claim 7 wherein the vibrator includes two or more oscillators, each oscillator inducing linear motion of the holder in a different direction.

13. The manipulation apparatus of claim 7 further comprising a microdrive affixed to the holder, the microdrive allowing translation of the holder in one or more directions.

14. The manipulation apparatus of claim 1 further comprising a microscope adjacent to the holder.

15. A method of manipulating a micro-/nanoobject comprising the steps of:

a. exerting an attractive force on the micro-/nanoobject with a holder;

b. inducing orbital motion in the holder in at least one plane, whereby the orbital motion of the holder causes rotation of the micro-/nanoobject, with the attractive force of the holder maintaining the micro-/nanoobject adjacent the holder during such rotation.

16. The method of claim 15 wherein the step of inducing orbital motion in the holder comprises providing oscillating linear inputs to the holder in at least two dissimilar directions.

17. The method of claim 15 wherein the step of exerting an attractive force on the micro-/nanoobject includes at least one of the steps of:

a. generating negative fluid pressure at the holder;

b. generating an electrostatic attraction at the holder;

c. generating magnetic attraction at the holder; or d. generating Van der Waals forces at the holder.

18. The method of claim 15 further comprising the step of increasing the attractive force of the holder on the micro-/nanoobject once the micro-/nanoobject has been rotated to a desired orientation.

19. The method of claim 15 further comprising the steps of:

a. ceasing orbital motion of the holder once the micro-/nanoobject has been rotated to a desired orientation; and b. increasing the attractive force of the holder on the micro-/nanoobject, thereby fixing the micro-/nanoobject to the holder.

20. The method of claim 15 further comprising the step of translating the holder in at least one direction, thereby causing a corresponding translation of the micro-/nanoobject.

\* \* \* \* \*